United States Patent
Johnson et al.

(10) Patent No.: US 9,082,440 B2
(45) Date of Patent: Jul. 14, 2015

(54) USING FIRST AND SECOND RESISTIVE SENSOR BIAS LEVELS TO DETECT HEAD-TO-DISK CONTACT AND/OR CLEARANCE

(75) Inventors: Michael Thomas Johnson, Minneapolis, MN (US); Manuel Charles Anaya Dufresne, Edina, MN (US); Xuan Zheng, Savage, MN (US); Dongming Liu, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 199 days.

(21) Appl. No.: 13/555,581

(22) Filed: Jul. 23, 2012

(65) Prior Publication Data

US 2014/0023108 A1    Jan. 23, 2014

(51) Int. Cl.
| | | |
|---|---|---|
| *G01N 25/00* | (2006.01) | |
| *G01K 13/00* | (2006.01) | |
| *G01K 1/00* | (2006.01) | |
| *G01K 7/00* | (2006.01) | |
| *G11B 5/60* | (2006.01) | |

(52) U.S. Cl.
CPC .............. *G11B 5/607* (2013.01); *G11B 5/6076* (2013.01)

(58) Field of Classification Search
CPC ........... G01K 7/16; G01K 7/00; G01K 13/00; G01K 1/143; G11B 5/607; G11B 5/6076
USPC .......................................................... 374/45
See application file for complete search history.

(56) References Cited

U.S. PATENT DOCUMENTS

| | | | |
|---|---|---|---|
| 5,527,110 A | 6/1996 | Abraham et al. | |
| 5,991,113 A | 11/1999 | Meyer et al. | |
| 6,963,464 B2 * | 11/2005 | Xu et al. | 360/75 |
| 7,589,928 B2 * | 9/2009 | Roy et al. | 360/75 |
| 7,800,858 B1 | 9/2010 | Bajkar et al. | |
| 2002/0191672 A1 | 12/2002 | Abraham et al. | |
| 2004/0190175 A1 * | 9/2004 | Chey et al. | 360/59 |
| 2004/0240109 A1 | 12/2004 | Hamann et al. | |
| 2008/0239581 A1 | 10/2008 | Ikai et al. | |
| 2011/0157736 A1 | 6/2011 | Contreras et al. | |
| 2011/0157740 A1 | 6/2011 | Baumgart et al. | |
| 2011/0235208 A1 * | 9/2011 | Yang | 360/75 |

(Continued)

FOREIGN PATENT DOCUMENTS

| | | |
|---|---|---|
| JP | 2008097760 | 4/2008 |
| KR | 102011018180 | 10/2011 |

OTHER PUBLICATIONS

Office Action dated Jun. 12, 2014 from Korean Patent Application No. 10-2013-0086911, 7 pages.

(Continued)

*Primary Examiner* — Mirellys Jagan
(74) *Attorney, Agent, or Firm* — Hollingsworth Davis, LLC

(57) ABSTRACT

A bias signal is applied to a resistive thermal sensor located proximate a magnetic media reading surface of a magnetic sensor. The bias signal is modulated between first and second bias levels. First and second resistances of the resistive thermal sensor corresponding to the first and second bias levels are measured. Based a difference between the first and second resistances caused by in increase in thermal conductivity between the magnetic sensor and a medium as the magnetic head gets closer to the medium, at least one of a spacing and a contact between the magnetic sensor and the medium are determined.

21 Claims, 5 Drawing Sheets

(56) References Cited

U.S. PATENT DOCUMENTS

| | | |
|---|---|---|
| 2012/0120519 A1 | 5/2012 | Kunkel et al. |
| 2012/0120522 A1* | 5/2012 | Johnson et al. ............. 360/75 |
| 2012/0120982 A1* | 5/2012 | Anaya-Dufresne et al. .. 374/141 |
| 2012/0201108 A1* | 8/2012 | Zheng et al. ............ 369/13.26 |
| 2014/0009851 A1* | 1/2014 | Budde ........................ 360/59 |

OTHER PUBLICATIONS

European Search Report dated Apr. 9, 2014 from European Application No. 13173887.4, 8 pages.

* cited by examiner

USING FIRST AND SECOND RESISTIVE SENSOR BIAS LEVELS TO DETECT HEAD-TO-DISK CONTACT AND/OR CLEARANCE

SUMMARY

The present disclosure is directed to using first and second resistive sensor bias levels to detect head-to-disk contact and/or clearance. In one embodiment, a bias signal is applied to a resistive thermal sensor located proximate a magnetic media reading surface of a magnetic sensor. The bias signal is modulated between first and second bias levels. First and second resistances of the resistive thermal sensor corresponding to the first and second bias levels are measured. At least one of a spacing and a contact between the magnetic head and a medium are determined based a difference between the first and second resistances caused by in increase in thermal conductivity between the magnetic sensor and a medium as the magnetic sensor gets closer to the medium.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to magnetic recording devices used for data storage. Data storage systems may include one or more recording heads that read and write information to a magnetic recording medium. It is often desirable to have a relatively small distance or spacing between a recording head and its associated media. This distance or spacing is known as "fly height" or "head-media spacing." By reducing the head-media spacing, a recording head may better be able to both write and read data to and from a medium. Reducing the head-media spacing also allows for surveying of recording medium topography, such as for detecting asperities and other features of the recording medium surface.

Figure 1A:
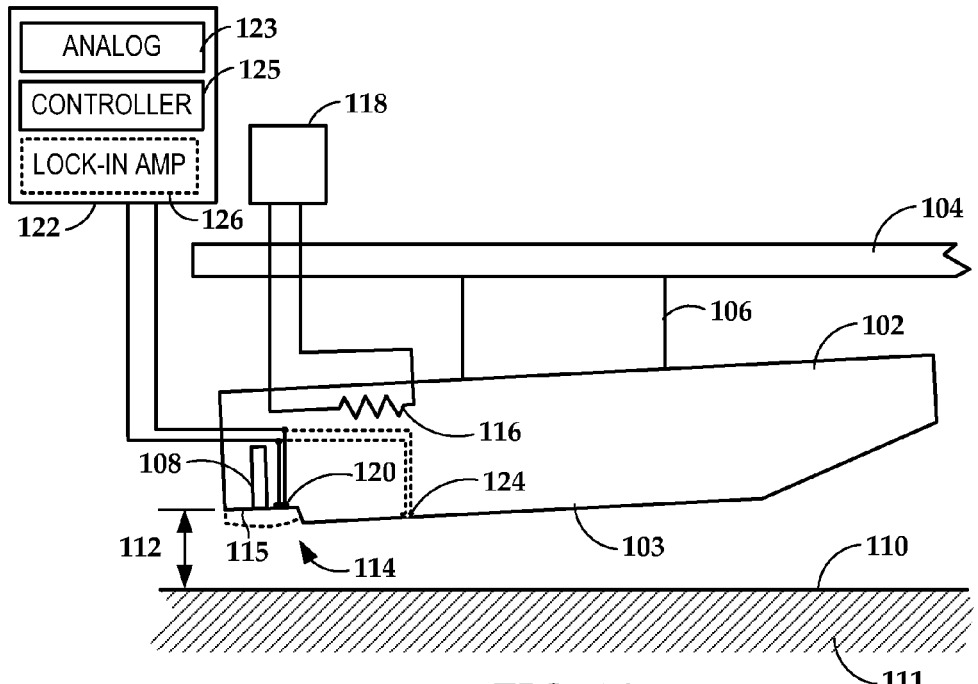
FIG. 1A is a block diagram of a hard drive slider and media arrangement of an apparatus according to an example embodiment.

In reference now to FIG. 1A, a block diagram shows a side view of a magnetic sensor employed in a hard drive slider 102 according to an example embodiment. The slider 102 is coupled to an arm 104 by way of a suspension 106 that allows some relative motion between the slider 102 and arm 104. The slider 102 includes read/write transducers 108 at a media reading surface 115 near a trailing edge of the slider 102. The transducers 108 are held proximate to a surface 110 of a magnetic recording medium, e.g., magnetic disk 111, when reading and writing to the medium. When the slider 102 is located over surface 110 of the disk 111, a fly height 112 is maintained between the slider 102 and the surface 110 by a downward force of arm 104. This downward force is counterbalanced by an air cushion that exists between the surface 110 and an air bearing surface 103 of the slider 102 when the disk 111 is rotating.

It is desirable to maintain a predetermined slider fly height 112 over a normal range of disk rotational speeds during both reading and writing operations to ensure consistent performance. Region 114 encompasses a "close point" of the slider 102, which is generally understood to be the closest point of contact between the slider 102 and the magnetic recording medium surface 110. To account for both static and dynamic variations that may affect slider fly height 112, the slider 102 may be configured such that a region 114 of the slider 102 near the transducers 108 can be configurably adjusted during operation. This is shown in FIG. 1A by a dotted line that represents a change in geometry of the region 114. In this example, the geometry change may be induced, in whole or in part, by an increase or decrease in temperature of the region 114.

The ability to alter shape of the region 114 due to temperature change may be due, e.g., to the region 114 being formed from a different material than other parts of the slider 102. In such a case, changes in temperature causes a deformation in this area 114 due to different thermal expansion properties of the respective materials. Thus, selective application of heat to the slider 102 can be used to finely adjust the effective fly height 112 of the transducers 108, e.g., as measured between the transducers 108 and media surface 110.

To provide this type of control over effective fly height 112, the slider 102 may include (or otherwise be thermally coupled to) a heating element 116. This heating element 116 (e.g., a resistance heater) may be provided with selectable amounts of current by a control circuit 118. The heating element 116 can be mounted at a variety of locations (e.g., near region 114) and in a manner that minimizes its influence on the aerodynamic properties of the slider 102. Other elements of the slider 102 may also provide heat besides or in addition to the heating element 116. For example, a write coil of the read/write transducer 108 may generate sufficient heat to cause configurable deformation of region 114. Also, non-thermal devices (e.g., piezo-electric devices) may also cause some deformation/deflection of the region 114 instead of or in addition to the heating element 116. It will be appreciated that the slider 102 may include two or more independent close point regions 114 and heaters 116, e.g., one region and heater associated with a read sensor and the other region and heater associated with a write transducer.

The slider 102 also includes a resistive temperature sensor 120 located at or proximate to region 114. This sensor 120 has a temperature coefficient of resistance (TCR) that enables high precision measurements of temperature (or temperature change) at the region 114, and is sometimes referred to as a TCR sensor. The TCR sensor 120 is coupled to sensor/control circuitry 122 that communicates with the sensor 120. The control circuitry 122 may at least include analog circuitry 123 for communicating with sensor (e.g., having a biasing circuit for applying a bias signal to sensor 120). The analog circuitry 123 may include, but is not limited to, amplifiers, preamplifiers, filters, current/voltage limiters, etc. The sensor/control circuitry 122 also includes a controller 125, which may include logic circuitry configured to perform the sensing and control functions described herein. Optionally, the slider 102 may include one or more other TCR sensors, as represented by sensor 124, which is also coupled to sensor circuitry 122. The sensor 124 is disposed in a physically separate location from sensor 120, and can be wired separately from sensor 120 or together with sensor 120 (e.g., in series or parallel).

The TCR sensor 120 on the air bearing surface is biased by sensor circuitry 122, and the response may also be monitored via circuitry 122. For example, the bias may be a constant current applied to the sensor 120, and the response may be the resulting voltage across the sensor 120. This voltage is proportional to resistance of the sensor in accordance with Ohm's Law, and therefore the voltage can be converted to a resistance value. The concepts described herein may also be applicable to other biasing signals and responses, e.g., constant applied voltage that results in current that varies according to sensor resistance.

The response of the sensor 120 may be used to sense contact with the media surface 110 and/or to detect fly height 112 of the slider 102 over the surface 110 during operation. Some existing contact detection techniques involve applying a DC bias to the sensor 120 and attempting to detect relative changes in resistance as power to the heater 116 is varied. As the close point region 114 comes into contact with the media surface 110, friction may generally cause an increase of the sensor resistance due to an increase in temperature, which can be detected as in a DC resistance signal of the sensor 120. However, DC resistance measurements are subject to noise, and may require a large number of samples before DC resistance can be estimated. This may make the response of the system unacceptably slow. Also, the sensitivity of this technique may significantly depend on the actuation efficiency of the heater 116. This can make it more difficult to consistently set contact threshold over changes in air bearing conditions. For example, a difference in contact response between air bearing designs might purely be from efficiency differences between the heaters.

Another contact detection technique involves measuring RMS power of the sensed resistance (or voltage) readings of the sensor 120. Mechanical and thermal perturbations occur in the region 114 due to slider-to-disk contact, and these perturbations can be detected in the form of a signature (e.g., an increase) in the RMS value of the sensor output. This detection technique puts bounds on how low the clearance between the heat and the disc can be set because of clearance variations generated by the modulation as well as a potential for increased wear. A contact method that reduces the dependence of contact signal or heater efficiency is therefore desirable.

In one example, one or more sensors 120, 124 are biased by a time varying signal that changes between two levels at a predetermined frequency. In response to this bias, a change in resistance from first to second resistance values in response to the two bias levels may be detected. This change in resistance does not depend directly on the heater efficiency. As a result, the resistance changes due to heating variations of heaters are automatically removed. The one or more sensors 120, 124 can be biased at a known modulation frequency, which allows narrow band filters (or lock-in amplifier 126) to be used to remove noise and increase signal-to-noise ratio (SNR). The sensors 120, 124 outputs can be processed in the time domain and/or frequency domain, e.g., via a digital signal processor which can be used to convert time domain measurements to frequency domain information.

Figure 1B:
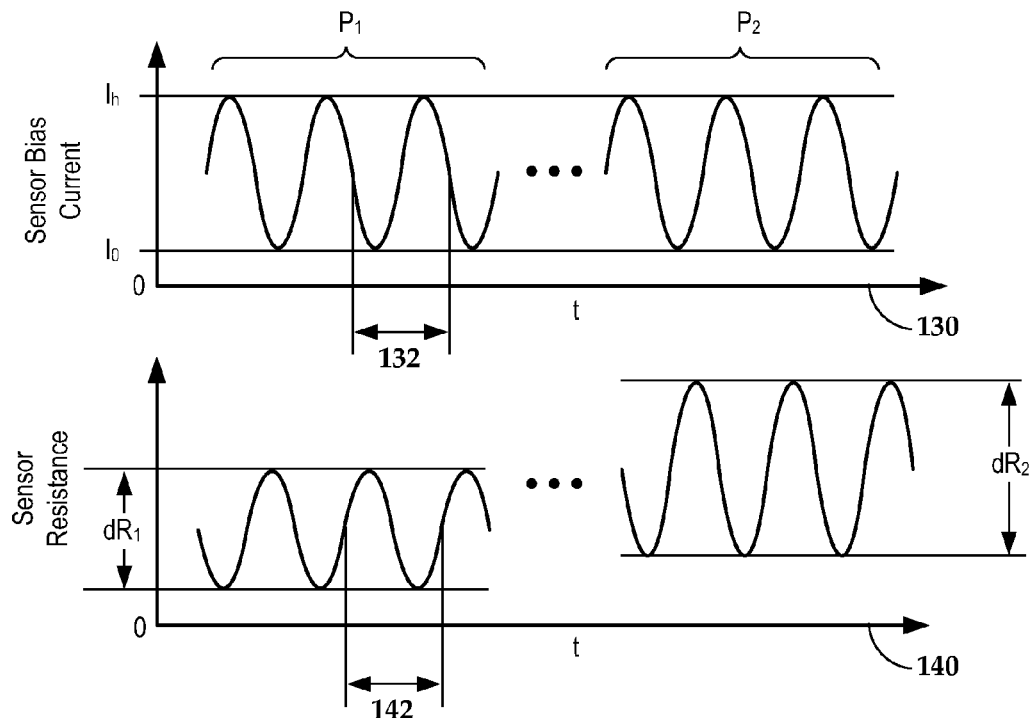
FIG. 1B is a graph showing bias currents and resistance of a resistive sensor for different heater currents according to an example embodiment.

In some embodiments described herein, for a fixed heater power, a modulated bias may used to measure changes in resistance in sensor 120 resulting from thermal conductivity changes. For purposes of this disclosure, this bias may be referred to as an alternating current (AC) bias, as the bias current alternates at least in magnitude over time, and optionally in direction. The AC current modulation parameters may be constant, e.g., having the same minimum value, maximum value, frequency, shape, etc., over time. In FIG. 1B, graphs 130, 140 show an example of an AC bias signal and associated response, respectively, of a resistive temperature sensor according to an example embodiment.

Graph 130 is a plot of applied bias current versus time. The current varies between two values, $I_0$ and $I_h$. In this example, the current varies sinusoidally, although other waveform shapes are possible (e.g., square wave, sawtooth). The current waveform maintains the values of $I_0$ and $I_h$ over time, so that the extremum (or any other value measured at the same time over successive periods) remains constant over time, even thought the current itself is varying sinusoidally. Note that in this example, $I_0$ is positive, and so the current does not change direction as is sometimes associated with AC waveforms. Thus the signal in this embodiment may be considered a modulated DC signal with positive values of $I_0$ and $I_h$. In other embodiments, the value of one or both of $I_0$ and $I_h$ may be negative, in which case $I_0$ may be considered a first extremum with the lowest magnitude, and $I_h$ may be considered a second extremum of highest magnitude.

Two time periods applicable to both graphs 130, 140 are annotated in FIG. 1B as $P_1$ and $P_2$. This refers to periods where two different power levels are applied to a heater (e.g., heater 116 in FIG. 1A) that is used to adjust clearance between a slider and media (e.g., fly height 112 in FIG. 1A). This change in heater power will result in a change in local temperature at the sensor 120, which results in a variation of resistance as seen in graph 140. When $P_1$ is applied, the difference between the minimum and maximum resistance is $dR_1$. When $P_2$ is applied the difference between the minimum and maximum resistance is $dR_2$. As will be explained below, the magnitude of $dR_1$ is different than $dR_2$, and these differences can be continuously tracked to determine head-to-disk contact, as well as active clearance between the head-to-disk (e.g., fly height 112).

It should be noted that the waveforms in graphs 130 and 140 are at substantially the same frequency (indicated inferentially by wavelengths 132, 142), this frequency being applied to the sensor 120 from control circuitry 122. The output of the sensor 120 in graph 140 can be examined only at this frequency 142, thereby reducing the effects of noise on the measurement. For example, the sensor circuitry 122 may utilize a lock-in amplifier 126 (also known as a phase-sensitive detector) that is tuned for the same frequency 132 that is applied to the sensor 120.

The example shown in FIG. 1B is just one way of measuring the time-varying resistance of a sensor 120. The changes in heat transfer at or near contact may also be determined, for example, by applying different first and second bias levels to sensors 120, 124, respectively, measuring two separate resistance measurements from sensors 120, 124, and taking the difference to determine contact and/or clearance. The first and second bias levels may have AC components. The AC components facilitate analyzing resistance in the frequency domain, thereby reducing the effects of noise.

Figure 2A:
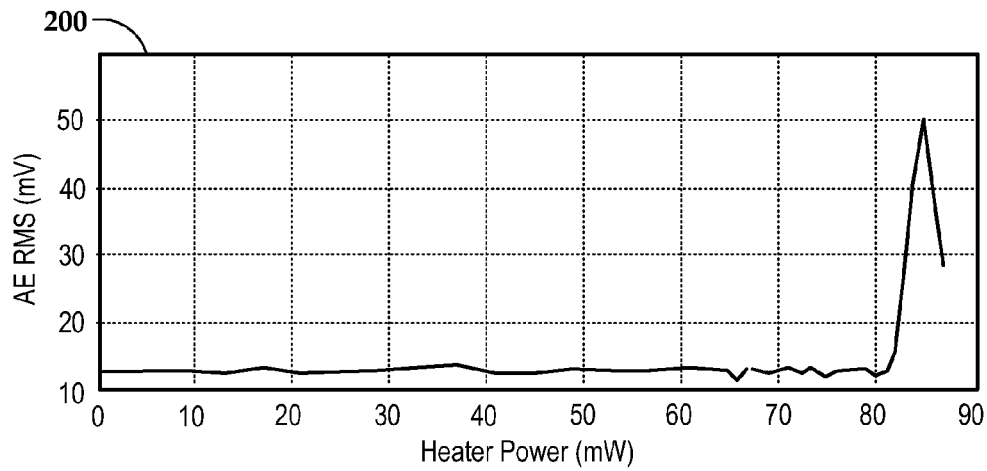
FIGS. 2A-2C are graphs illustrating measured responses of a device according to an example embodiment.

The use of an AC bias also does not require sensitive measurements of DC bias level in response contact detection level, but instead looks at the response to bias changes. Note that this technique does not depend on contact modulation in the head-to-media interface to create a contact signature, but uses changes in thermal conductivity. As a result, these measurements may also be used to determine clearance out of contact by monitoring thermal conductivity changes before contact is observed A set of measured responses of a device according to an example embodiment is shown in the graphs 200, 210, and 220 of FIGS. 2A-2C. Graph 200 is a plot of RMS acoustic emissions (AE) of a slider relative to heater power. This graph 200 indicates head-to-disk contact occurring at a heater power of approximately 85 mW. Graph 210 shows resistance measurements 214, 216 for two different sensor bias powers (100 uW and 600 uW, respectively) as a function of heater power. The sensor bias powers resulting in curves 214, 216 approximately correspond to different levels of applied current $I_0$ and $I_h$ as shown in FIG. 1B.

Both curves 214, 216 exhibit a noticeable change in slope at the contact point, which may be generally attributed to an increase in heat at the contact point. However, curve 216 increases much less of a change at contact than curve 214. This may be generally attributed to an increase in temperature caused by the sensor itself at this higher input power. The amount of heat conducted away from the contact point increases due to the higher temperature difference between the contact point and its surroundings (e.g., air, media surface). As a result, there will be less of a change in resistance at contact for curve 216 because the surroundings are also at a higher temperature, and more change in resistance for curve 214 due to increased temperature difference between the sensor and surroundings. Thus, even though the net bias power applied to the thermal sensor is the same throughout the heater sweep, the resistance change of the thermal sensor is smaller during and after contact because of an increase in the thermal conductivity seen by the thermal sensors.

Figure 2B:
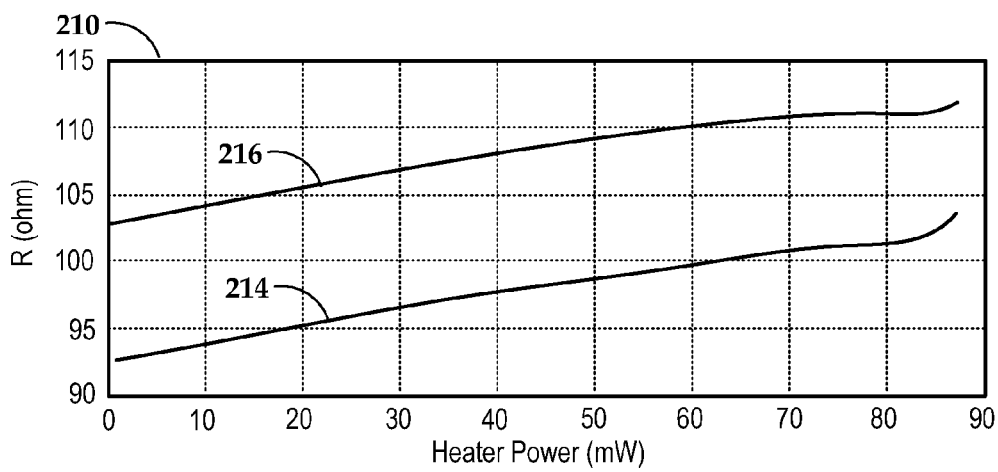
Figure 2C:
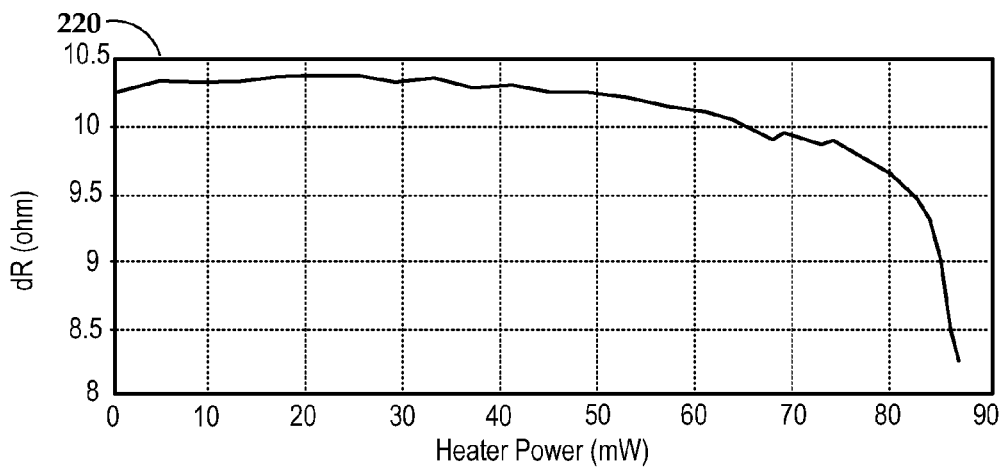

Graph 220 in FIG. 2C shows the resistance difference between the two bias measurements for the same range of heater power shown in FIG. 2B. This graph 220 illustrates a steep decline at the point of contact (e.g., heater power of approximately 85 mW), as well as a steady decrease in value leading up to contact, e.g., in the general region between 50 mW to 85 mW of heater power. The results illustrated in this graph can be utilized in a device for detecting head-media spacing and/or head-media contact.

A simple lumped parameter models shows that the inverse of the dual-ended TCR (DETCR) resistance change can be used to determine the thermal conductivity changes in the gap. The resistance change with temperature, $R=R_a+\alpha R_a \Delta T$, and the relation between thermal flux and temperature, $q=h\Delta T$, can be combined to determine the resistance change of the wire to that from thermal flux and conduction.

$$R = R_a + \alpha R_a \frac{q(P_{bias}, P_h)}{h(P_h)} = R_a + \alpha R_a \frac{q_0(P_h) + aP_{bias}}{h(P_h)} \quad [1]$$

In Equation 1, R is the TCR sensor resistance, $R_a$ is the TCR sensor cold resistance, alpha is the thermal coefficient of resistance, $h(P_h)$ is the thermal conduction in the interface, and $q(P_{bias}, P_h)$ is the energy flux seen by the TCR sensor. Measurements show that it is a reasonable assumption to have the energy flux from the TCR sensor proportional to the sensor bias. These measurements also show that this increase can be added on top of that from the heater. Taking the derivate of R with respect to $P_{bias}$ gives a relation between the change in R with bias and the thermal conduction in the interface as seen in Equation 2 below.

$$s(P_h) = \frac{dR}{dP_{bias}} = \frac{\alpha R_a a}{h(P_h)} \quad [2]$$

Because the TCR and cold resistance may be considered constants for a given device, the change in thermal conduction can be derived relative to that for the zero heater power case. The result is a determination of the thermal conductance change that is independent of the TCR and cold resistance of the sensor. This eliminates process variation effects in the thermal conduction measurement when used to set clearance and declaring contact. To further simplify the implementation, using a fixed bias change, $dP_{bias}$, allows the relative change in thermal conduction to be determined from resistance changes alone, as seen below in Equation 3.

$$\frac{h(P_h)}{h_0} = \frac{s(0)}{s(P_h)} = \frac{dR(0)}{dR(P_h)} \quad [3]$$

Figure 3:
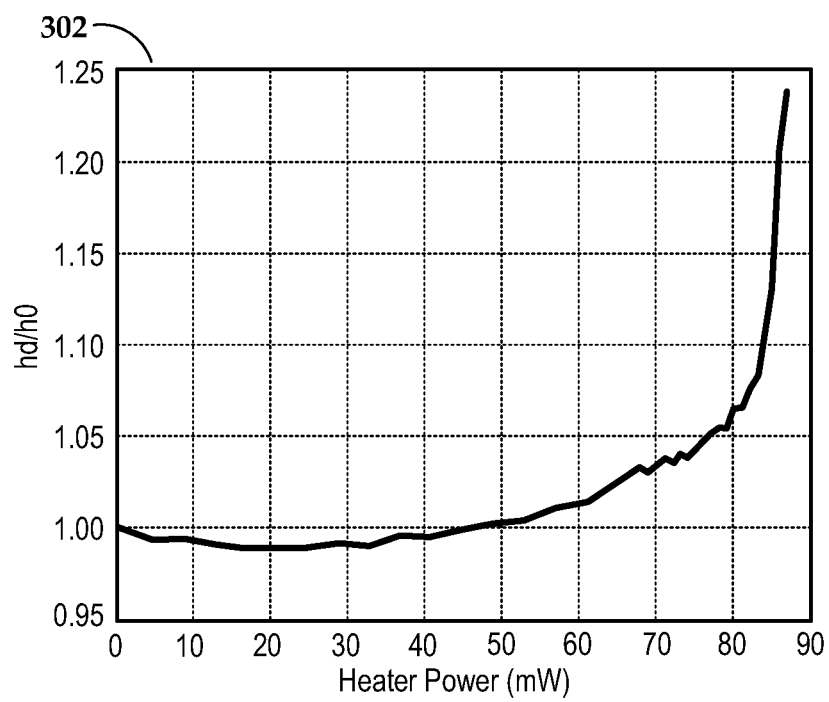
FIG. 3 illustrates the thermal conductions determined from measurements using a lumped parameter model according to an example embodiment.

In FIG. 2C, the graph 220 shows an example of such a measurement of dR for a fixed $dP_{bias}$. These measurements can be used along with the lumped model to calculate the change in TCR sensor resistance and thermal conductivity relative to that at zero heater power, as shown in FIG. 3. In FIG. 3, a graph 302 shows the thermal conductivity change relative to thermal conductivity at zero heater power relative to heater power determined from the curve in FIG. 2C using the lumped parameter model. As can be seen in FIG. 3, contact is at 85 mW in this example, where a 7% increase in the thermal conductivity is seen. At lower powers before contact, the thermal conductivity increases by 5% because of pressures changes in the interface as the gap is narrowed. This provides a signal that can be used to determine clearance changes while out of contact with the disk.

Figure 4A:
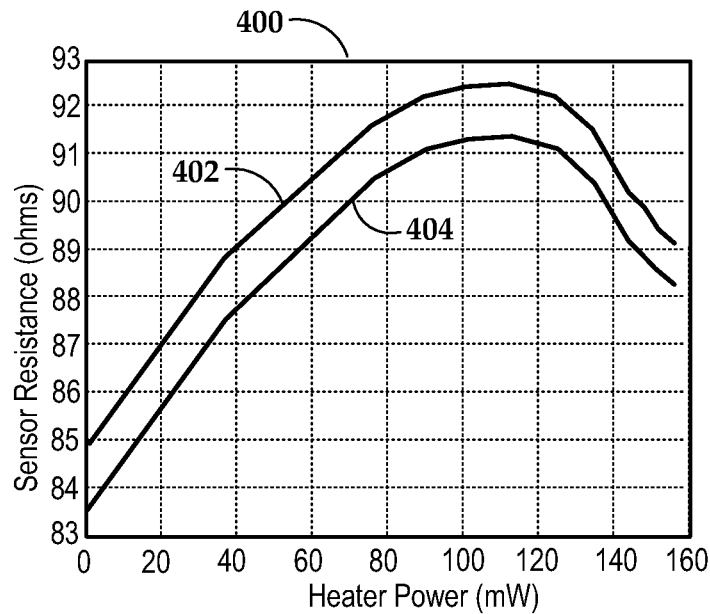
FIGS. 4A-4B are graphs illustrating finite element modeling results of a device according to an example embodiment.
Figure 4B:
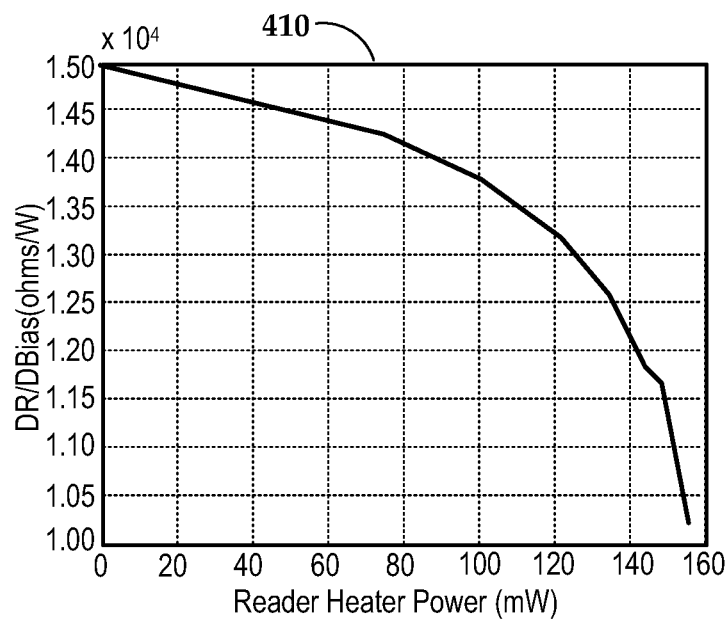

In FIGS. 4A and 4B, graphs 400, 410 illustrate results of finite element (FE) analysis of TCR sensor resistance change for different bias powers in a configuration similar to that used for measurements in FIGS. 2B-2C. In graph 400, curves 402 and 404 represent TCR resistance for bias powers of 100 mW and 50 mW, respectively. The difference between these curves 402, 404 is seen in graph 410 of FIG. 4B. These results are similar to the measurements shown in FIGS. 2B-2C Thermal conductivities for the FEM results can be calculated using a lumped parameter for direct comparison to measurements. Finite element model results that include both out of contact and in contact cooling also show similar DETCR resistance changes vs. bias as seen in FIG. 2C. This shows the potential for FE models to predict design performance and allow sensitivity analysis to be performed.

Figure 5:
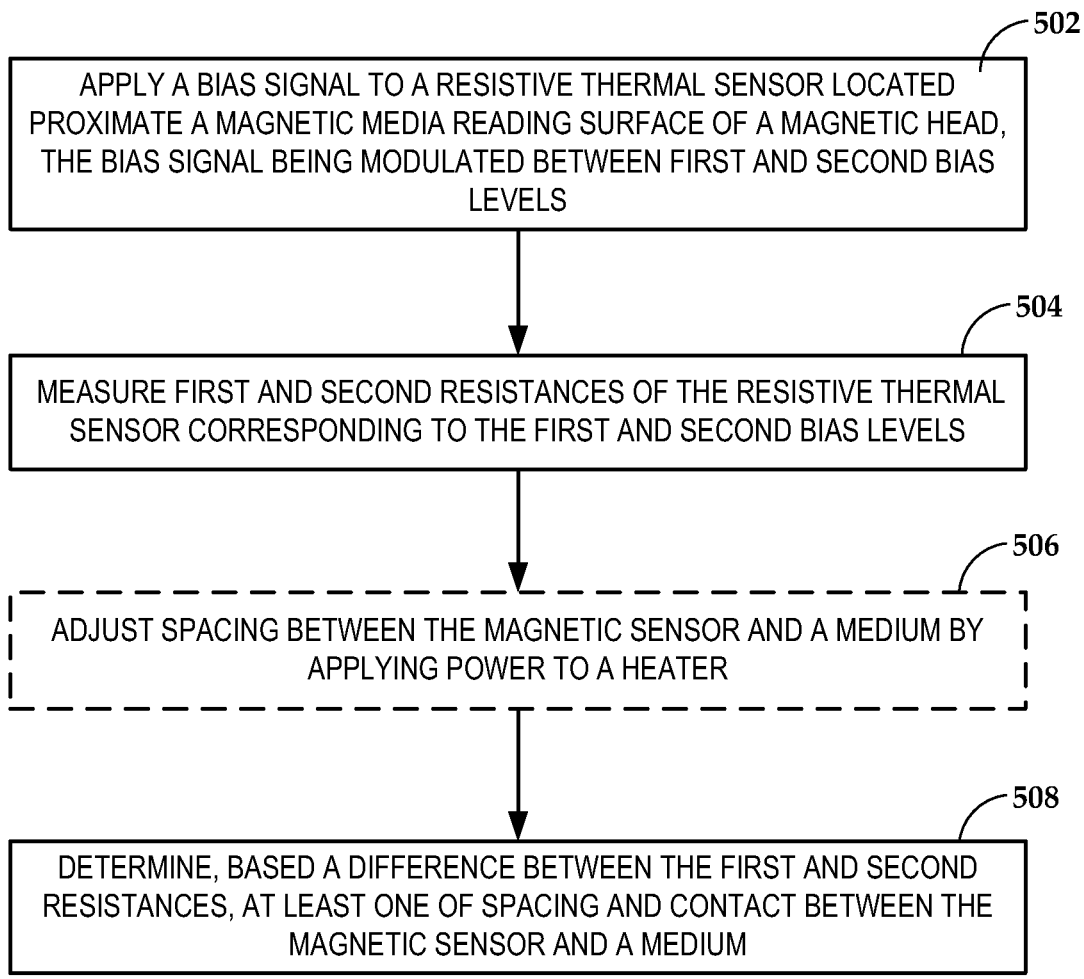
FIG. 5 is a flowchart illustrating a procedure according to an example embodiment.

In reference now to FIG. 5, a flowchart illustrates a procedure according to an example embodiment. The method involves applying a bias signal to a resistive thermal sensor located proximate a magnetic media reading surface of a magnetic head. The bias signal is modulated 502 between first and second bias levels. First and second resistances of the resistive thermal sensor corresponding to the first and second bias levels are measured 504. The first and second resistances may be in the frequency domain and/or measured at a frequency corresponding to a frequency at which the bias signal is modulated. For example, the first and second resistances may be measured via a lock-in amplifier and/or a narrow-band filter.

A spacing between the magnetic sensor and a medium may optionally be adjusted 506 by applying power to a heater. At least one of a spacing and a contact between the magnetic head and a medium is determined 508 based a difference between the first and second resistances. The difference in resistance is caused by an increase in thermal conductivity between the magnetic head and a medium as the magnetic head gets closer to the medium. The spacing/contact may be determined based on change of the differences between the first and second resistances relative to a power applied to the heater.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
   a biasing circuit configured to apply a modulated DC bias signal to a resistive thermal sensor that is disposed proximately to a media reading surface of a magnetic sensor, the bias signal being modulated between first and second bias levels; and
   a controller configured to:
     measure first and second resistances of the resistive thermal sensor corresponding to the first and second bias levels; and
     determine at least one of a spacing and a contact between the magnetic sensor and a medium based on a difference between the first and second resistances as a function of heater power used to adjust the spacing between the magnetic sensor and the medium, wherein the difference is caused by an increase in thermal conductivity between the magnetic sensor and the medium as the magnetic sensor gets closer to the medium and wherein the difference determines thermal conductance change between the resistive thermal sensor and the medium independently of a thermal coefficient of thermal resistance and a cold resistance of the resistive thermal sensor.

2. The apparatus of claim 1, wherein determining the at least one of the spacing and the contact between the magnetic sensor and the medium comprises determining a rate of change of the difference between the first and second resistances relative to the heater power.

3. The apparatus of claim 1, wherein the first and second resistances are measured in a frequency domain.

4. The apparatus of claim 1, wherein determining at least one of the spacing and the contact comprises determining, via the difference between the first and second resistances, a thermal conductivity change when the heater power is applied relative to a thermal conductivity at zero heater power.

5. The apparatus of claim 4, wherein the determination of the thermal conductivity change utilizes a lumped parameter model of heat transfer near the magnetic sensor.

6. The apparatus of claim 1, wherein the first and second resistances are measured at a frequency corresponding to a modulation frequency of the bias signal.

7. The apparatus of claim 6, further comprising a lock-in amplifier coupled to one of the biasing circuit and the controller to measure the first and second resistances.

8. The apparatus of claim 6, further comprising a narrow-band filter coupled to one of the biasing circuit and the controller to measure the first and second resistances.

9. A method comprising:
   applying a modulated DC bias signal to a resistive thermal sensor located proximate a magnetic media reading surface of a magnetic sensor, the bias signal being modulated between first and second bias levels;
   measuring first and second resistances of the resistive thermal sensor corresponding to the first and second bias levels; and
   determining at least one of a spacing and a contact between the magnetic sensor and a medium based on a difference between the first and second resistances as a function of heater power used TO adjust the spacing between the magnetic sensor and the medium, wherein the difference is caused by an increase in thermal conductivity between the magnetic sensor and the medium as the magnetic sensor gets closer to the medium and wherein the difference determines thermal conductance change between the resistive thermal sensor and the medium independently of a thermal coefficient of thermal resistance and a cold resistance of the resistive thermal sensor.

10. The method of claim 9, wherein determining the at least one of the spacing and the contact between the magnetic sensor and the medium comprises determining a rate of change of the difference between the first and second resistances relative to the heater power.

11. The method of claim 9, wherein the first and second resistances are measured in a frequency domain.

12. The method of claim 9, wherein the first and second resistances are measured at a frequency corresponding to a modulation frequency of the bias signal.

13. The method of claim 12, wherein the first and second resistances are measured via a lock-in amplifier.

14. The method of claim 12, wherein the first and second resistances are measured via a narrow-band filter.

15. An apparatus, comprising:
    a magnetic sensor comprising a resistive thermal sensor proximate a media reading surface of the magnetic sensor;
    a biasing circuit coupled to the magnetic sensor and configured to apply a modulated DC bias signal comprising different first and second bias levels to the resistive thermal sensor; and
    a controller coupled to the magnetic sensor and configured to:
      measure first and second resistances of the resistive thermal sensor corresponding to the first and second bias levels; and
      determine at least one of a spacing and a contact between the magnetic sensor and a medium based on a difference between the first and second resistances as a function of heater power used TO adjust the spacing between the magnetic sensor and the medium, wherein the difference is caused by an increase in thermal conductivity between the magnetic sensor and the medium as the magnetic sensor gets closer to the medium and wherein the difference determines thermal conductance change between the resistive thermal sensor and the medium independently of a thermal coefficient of thermal resistance and a cold resistance of the resistive thermal sensor.

16. The apparatus of claim 15, further comprising a heater used to adjust the spacing between the magnetic sensor and the medium, and wherein determining the at least one of the spacing and the contact between the magnetic sensor and the medium comprises determining a rate of change of the difference between the first and second resistances relative to a power applied to the heater.

17. The apparatus of claim 15, wherein the first and second resistances are measured in a frequency domain.

18. The apparatus of claim 17, further comprising a lock-in amplifier coupled to one of the biasing circuit and the controller to measure the first and second resistances.

19. The apparatus of claim 17, further comprising a narrow-band filter coupled to one of the biasing circuit and the controller to measure the first and second resistances.

20. An apparatus, comprising:
a biasing circuit configured to apply a modulated DC bias signal to a resistive thermal sensor that is disposed proximately to a media reading surface of a magnetic sensor, the bias signal being modulated between first and second bias levels; and
a controller configured to:
measure first and second resistances of the resistive thermal sensor corresponding to the first and second bias levels; and
determine at least one of a spacing and a contact between the magnetic sensor and a medium based on a difference between the first and second resistances as a function of heater power used to adjust the spacing between the magnetic sensor and the medium, wherein the difference caused by an increase in thermal conductivity between the magnetic sensor and the medium as the magnetic sensor gets closer to the medium and wherein determining at least one of the spacing and the contact, via the difference between the first and second resistances, comprises determining a thermal conductivity change when the heater power is applied relative to a thermal conductivity at zero heater power.

21. The apparatus of claim 20, wherein the determination of the thermal conductivity change utilizes a lumped parameter model of heat transfer near the magnetic sensor.

* * * * *